(12) United States Patent
Salter et al.

(10) Patent No.: US 11,787,290 B2
(45) Date of Patent: Oct. 17, 2023

(54) PROJECTION ON A VEHICLE WINDOW

(71) Applicant: Ford Global Technologies, LLC, Dearborn, MI (US)

(72) Inventors: Stuart C. Salter, White Lake, MI (US); Kristopher Karl Brown, Dearborn, MI (US); John Robert Van Wiemeersch, Novi, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 17/392,570

(22) Filed: Aug. 3, 2021

(65) Prior Publication Data

US 2023/0053029 A1 Feb. 16, 2023

(51) Int. Cl.
  *B60K 35/00* (2006.01)
  *G06V 20/52* (2022.01)
  *G06V 20/58* (2022.01)
  *G06V 40/10* (2022.01)
  *B60R 25/31* (2013.01)
  (Continued)

(52) U.S. Cl.
  CPC ............ *B60K 5/00* (2013.01); *B60Q 1/24* (2013.01); *B60R 25/01* (2013.01); *B60R 25/1004* (2013.01); *B60R 25/305* (2013.01); *B60R 25/31* (2013.01); *G06V 20/52* (2022.01); *G06V 20/56* (2022.01); *G06V 20/58* (2022.01); *G06V 40/10* (2022.01); *G10L 13/033* (2013.01); *H04N 5/76* (2013.01); *H04N 7/18* (2013.01); *H04N 9/31* (2013.01); *B60K 2370/148* (2019.05); *B60K 2370/152* (2019.05); *B60K 2370/157* (2019.05); *B60K 2370/177* (2019.05); *B60K 2370/21* (2019.05); *B60K 2370/31* (2019.05)

(58) Field of Classification Search
  CPC ............. B60K 35/00; B60K 2370/152; B60K 2370/1529; B60K 2370/1531; B60K 2370/157; B60K 2370/1575; B60K 2370/176–178; B60K 2370/1876; B60K 2370/21; B60K 2370/29; B60K 2370/31; B60R 25/01; B60R 25/305; B60R 25/31; G06V 20/52; G06V 20/56; G06V 20/58; G06V 40/10; G06V 40/103
  USPC ..................................................... 701/28, 45
  See application file for complete search history.

(56) References Cited

U.S. PATENT DOCUMENTS 4,823,380 A   4/1989  Kohen et al.
6,882,715 B2  4/2005  Hom
(Continued)

FOREIGN PATENT DOCUMENTS

JP   2010257249 A   11/2010

OTHER PUBLICATIONS

Eliot, "Letting Your Kids Ride Alone in an Autonomous Self-Driving Car: Ever or Never?", EDT, May 23, 2019.

*Primary Examiner* — Erick R Solis
(74) *Attorney, Agent, or Firm* — Frank Lollo; Bejin Bieneman PLC

(57) ABSTRACT

A system includes a camera aimed externally to a vehicle, a window of the vehicle, a projector positioned to project on the window, and a computer communicatively coupled to the camera and the projector. The computer is programmed to, upon receiving data from the camera indicating a first person outside the vehicle, instruct the projector to project an image on the window depicting a second person inside the vehicle.

20 Claims, 5 Drawing Sheets

(51) Int. Cl.
*B60K 5/00* (2006.01)
*H04N 5/76* (2006.01)
*H04N 9/31* (2006.01)
*H04N 7/18* (2006.01)
*G10L 13/033* (2013.01)
*B60Q 1/24* (2006.01)
*B60R 25/01* (2013.01)
*B60R 25/30* (2013.01)
*B60R 25/10* (2013.01)
*G06V 20/56* (2022.01)

(56) References Cited

U.S. PATENT DOCUMENTS

| | | | |
|---|---|---|---|
| 10,777,057 B1* | 9/2020 | Siminoff | H04R 27/00 |
| 2013/0002870 A1* | 1/2013 | Cieler | B60R 25/10 |
| | | | 348/148 |
| 2017/0344826 A1* | 11/2017 | Kanematsu | B60K 28/066 |
| 2019/0220248 A1 | 7/2019 | Cordourier Maruri et al. | |
| 2020/0079215 A1* | 3/2020 | Thurimella | B60R 16/0373 |
| 2020/0258306 A1* | 8/2020 | Forutanpour | G06T 9/00 |
| 2020/0290513 A1* | 9/2020 | Karafin | G06F 3/1446 |
| 2020/0307437 A1* | 10/2020 | Thieberger | B62D 47/006 |
| 2021/0309183 A1* | 10/2021 | Bielby | G06V 20/52 |

* cited by examiner

US 11,787,290 B2

PROJECTION ON A VEHICLE WINDOW

BACKGROUND

Vehicles include passenger cabins to house occupants of the vehicles. A passenger cabin is enclosed by the vehicle when doors and windows of the vehicle are closed. The windows are formed of a durable transparent material, typically glass such as laminated, tempered glass or plastic such as Plexiglas® or polycarbonate. The windows permit the occupants to see people outside the vehicle and people outside the vehicle to see the occupants.

DETAILED DESCRIPTION

Figure 1:
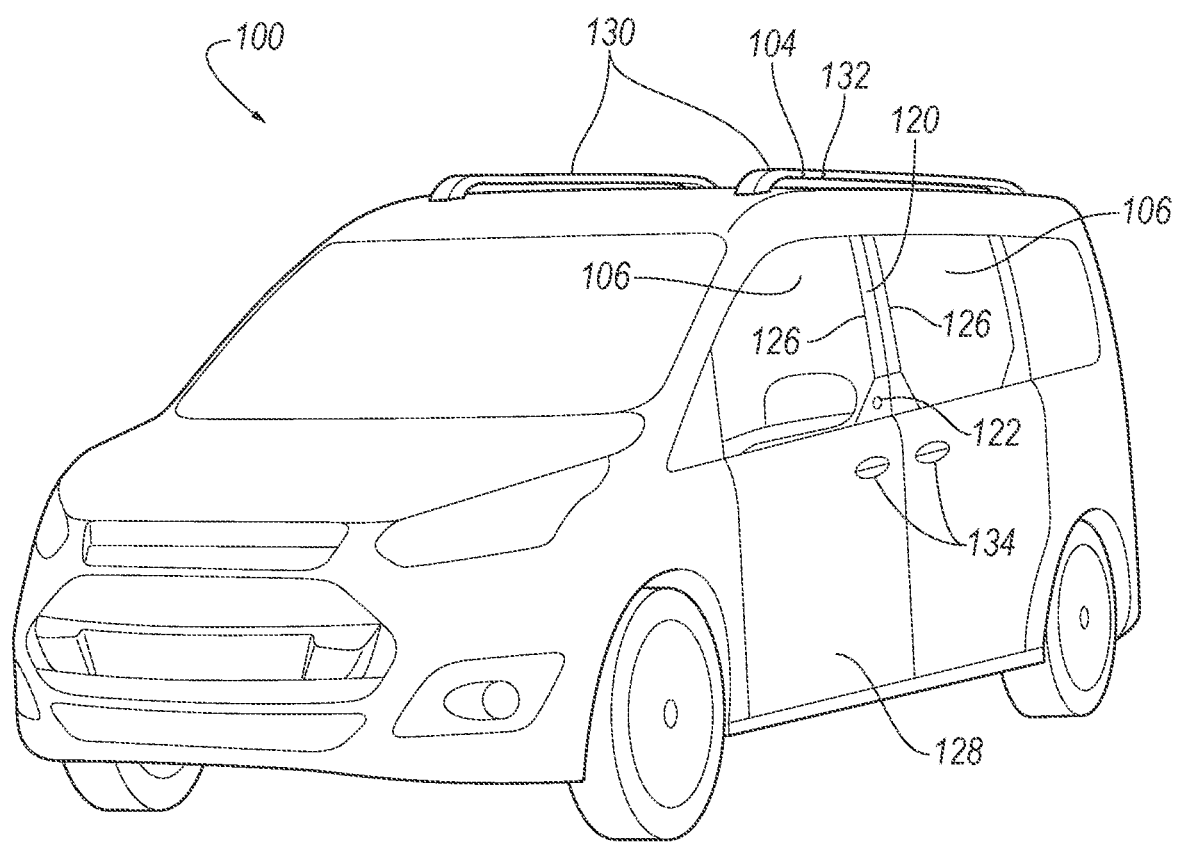
FIG. 1 is a perspective view of an example vehicle.

A system includes a camera aimed externally to a vehicle, a window of the vehicle, a projector positioned to project on the window, and a computer communicatively coupled to the camera and the projector. The computer is programmed to, upon receiving data from the camera indicating a first person outside the vehicle, instruct the projector to project an image on the window depicting a second person inside the vehicle.

The system may further include a speaker directed externally to the vehicle and communicatively coupled to the computer. The system may further include a microphone inside the vehicle and communicatively coupled to the computer, and the computer may be programmed to, upon receiving the data from the camera indicating the first person outside the vehicle, apply a modification to a voice sound detected by the microphone, and instruct the speaker to play the modified voice sound. The modification may include deepening the voice sound.

The computer may be programmed to, upon receiving the data from the camera indicating the first person outside the vehicle, instruct the speaker to play a stored audio recording while playing the modified voice sound.

The computer may be programmed to, upon receiving the data from the camera indicating the first person outside the vehicle, instruct the speaker to play a stored audio recording.

The window may be tinted. The image may depict the second person as a silhouette.

The computer may be programmed to, upon receiving the data from the camera indicating the first person outside the vehicle, instruct locks of the vehicle to lock.

The system may further include a light on an exterior of the vehicle and communicatively coupled to the computer, and the computer may be programmed to, upon receiving the data from the camera indicating the first person outside the vehicle, instruct the light to illuminate.

The computer may be programmed to, upon receiving the data from the camera indicating the first person outside the vehicle, store image data of the first person of the data from the camera.

The computer may be programmed to, upon determining that the first person is a recognized person, refrain from instructing the projector to project.

The image may depict the second person as a different person than occupants of the vehicle.

The computer may be programmed to, in response to a risk score being less than a risk threshold, refrain from instructing the projector to project. The computer may be programmed to determine the risk score based on a location of the vehicle.

The computer may be programmed to determine the risk score based on a current time of day.

The computer may be programmed to determine the risk score based on a number of mobile devices proximate to the vehicle.

The computer may be programmed to determine the risk threshold based on occupants of the vehicle. The computer may be programmed to determine the risk threshold based on a number of the occupants of the vehicle.

The computer may be programmed to determine the risk threshold based on personal attributes of the occupants of the vehicle.

With reference to the Figures, wherein like numerals indicate like parts throughout the several views, a system 102 includes a camera 104 aimed externally to a vehicle 100, a window 106 of the vehicle 100, a projector 108 positioned to project on the window 106, and a computer 110 communicatively coupled to the camera 104 and the projector 108. The computer 110 is programmed, upon receiving data from the camera 104 indicating a first person 112 outside the vehicle 100, to instruct the projector 108 to project an image 114 on the window 106 depicting a second person 116 inside the vehicle 100.

The system 102 provides a technical solution for providing content on the window 106 of the vehicle 100, specifically content for the first person 112 outside the vehicle 100, via the projector 108 and the computer 110 controlling the projector 108. The system 102 can provide privacy for occupants 118 of the vehicle 100. The image 114 displayed by the projector 108 onto the window 106 can show the second person 116, who can be different than or unrecognizable as any of the occupants 118 of the vehicle 100. The system 102 may also include an external speaker 120 that can play audio toward the first person 112, such as a modified voice of the occupant 118 and/or a stored audio recording.

With reference to FIG. 1, the vehicle 100 may be any suitable type of ground vehicle, e.g., a passenger or commercial automobile such as a sedan, a coupe, a truck, a sport utility, a crossover, a van, a minivan, a taxi, a bus, etc.

Figure 2:
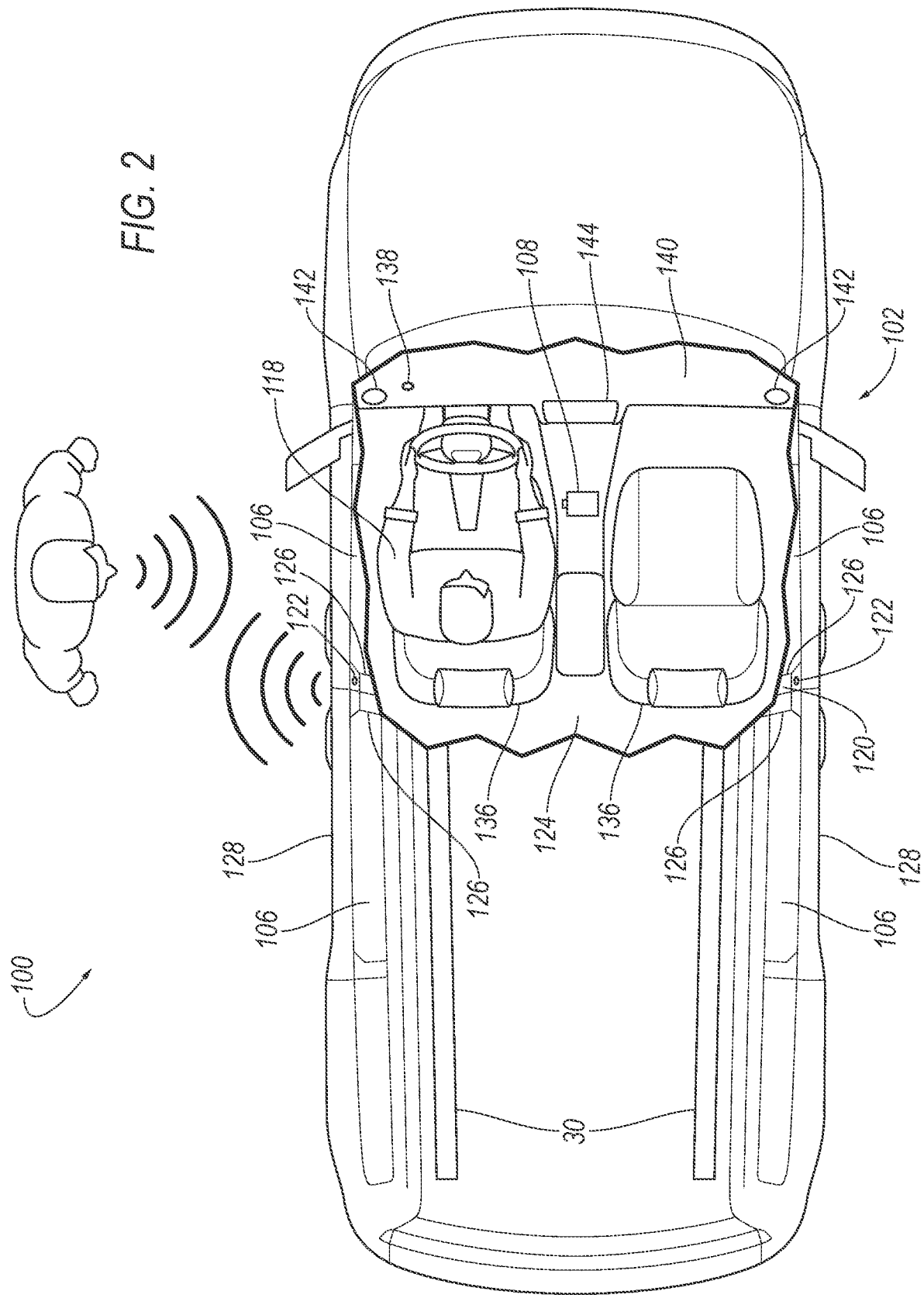
FIG. 2 is a top view of the vehicle with a passenger cabin exposed for illustration.

An external microphone 122 can be mounted outside a passenger cabin 124 of the vehicle 100, e.g., attached to outward-facing components of the vehicle 100. The external microphone 122 can be directed externally to the vehicle 100, i.e., oriented to detect sounds originating from sources spaced from the vehicle 100. For example, as shown in FIGS. 1 and 2, the external microphone 122 can be mounted to and possibly be part of a door panel 126, which is a component of a door 128 of the vehicle 100 that is directly outboard of a B pillar of the vehicle 100. The external microphone 122 can be mounted on a side of the vehicle 100, e.g., the driver side of the vehicle 100 as shown in the Figures.

The external microphone 122 is a transducer that converts sound into electrical signals. The external microphone 122 can be any suitable type for receiving sound from the first person 112 talking outside the vehicle 100, e.g., a dynamic microphone, a condenser microphone, a piezoelectric microphone, a transducer-on-glass microphone, a transducer-on-trim microphone, etc. If the external microphone 122 is a transducer-on-trim microphone, the external microphone 122 is part of the door panel 126. An advantage of the external microphone 122 being a transducer-on-trim microphone is that it is more difficult for environmental factors to interfere with performance of a transducer-on-trim microphone. A single piece of debris (e.g., dirt, mud, ice, snow) or the first person 112 applying pressure with their finger can significantly block or attenuate other types of microphones than transducer-on-trim microphones from sampling sounds.

The external speaker 120 can be mounted outside the passenger cabin 124 of the vehicle 100, e.g., attached to outward-facing components of the vehicle 100. The external speaker 120 can be directed externally to the vehicle 100, i.e., oriented to project sound away from the vehicle 100. For example, as shown in FIGS. 1 and 2, the external speaker 120 is mounted to the door panel 126 directly outboard of the B pillar of the vehicle 100. The external speaker 120 can be mounted to the same side of the vehicle 100 as the external microphone 122.

The external speaker 120 can be any suitable type of speaker audible to the first person 112 when relatively close to the vehicle 100. In particular, the external speaker 120 can be a panel exciter, i.e., which generates sound by vibrating a rigid panel. For example, an electric motor can be adhered to an inboard side of the door panel 126 and impart vibrations to the door panel 126 to generate sound. An advantage of the external speaker 120 being a panel exciter rather than a point speaker is that it is more difficult for environmental factors to interfere with performance of the external speaker 120. A single piece of debris (e.g., dirt, mud, ice, snow) or the first person 112 applying pressure with their finger can significantly block or attenuate sound from a point speaker but not from a panel exciter.

The camera 104 is aimed externally to the vehicle 100, e.g., oriented away from the vehicle 100, e.g., on a roof rack 130 and aimed laterally relative to the vehicle 100. This orientation can detect the first person 112 when approaching the doors 128.

The camera 104 can detect electromagnetic radiation in some range of wavelengths. For example, the camera 104 may detect visible light 132, infrared radiation, ultraviolet light 132, or some range of wavelengths including visible, infrared, and/or ultraviolet light 132. For example, the camera 104 can be a charge-coupled device (CCD), complementary metal oxide semiconductor (CMOS), or any other suitable type.

The system 102 can include a light 132 on an exterior of the vehicle 100, e.g., on the roof rack 130. The light 132 can be aimed in generally the same direction as the camera 104, e.g., aimed within a field of view of the camera 104, e.g., aimed laterally relative to the vehicle 100. The light 132 may be any type suitable for illuminating an environment surrounding the vehicle 100, including tungsten, halogen, high-intensity discharge (HID) such as xenon, light-emitting diode (LED), laser, etc.

The system 102 can include locks 134 of the doors 128, as is known. The locks 134 are movable from an unlocked position, in which pulling a handle of the door 128 opens the door 128, and a locked position, in which the door 128 is prevented from opening.

The windows 106 are movable via window actuators (not shown) between an open position and a closed position. The windows 106 in the closed position can be fully raised, and the windows 106 in the open position can be fully lowered, e.g., at least partially inside the respective doors 128. The windows 106 may be formed of any suitably durable transparent material, including glass such as laminated, tempered glass or plastic such as Plexiglas® or polycarbonate.

The windows 106 can be tinted, i.e., restrict how much light passes through the window 106, e.g., have a visual light transmission (VLT), for example, less than 50%. For example, the window 106 can include a window film restricting light passage, or the glass of the window 106 can include a pigment restricting light passage, i.e., factory tint.

The windows 106, e.g., the driver-side window 106, can include a film that is reactive to light of particular wavelengths, e.g., light projected by the projector 108 onto the window 106. For example, the film can include a phosphor coating or a quantum dot coating.

With reference to FIG. 2, the vehicle 100 includes the passenger cabin 124 to house occupants 118, if any, of the vehicle 100. The passenger cabin 124 can include, e.g., seats 136 for occupants 118 of the vehicle 100. The passenger cabin 124 can be enclosed by the vehicle 100 when the doors 128 and the windows 106 of the vehicle 100 are closed.

The projector 108 can be positioned inside the passenger cabin 124, e.g., on a ceiling of the passenger cabin 124. The projector 108 is positioned to project on one or more of the windows 106, e.g., on the driver-side window 106. The system 102 may include multiple projectors 108 for projecting on all or a plurality of the windows 106. The projector 108 can be any suitable type of video projector 108, e.g., lens-based or laser-based.

The system 102 can include an internal microphone 138. The internal microphone 138 can be mounted inside the vehicle 100, e.g., in the passenger cabin 124. For example, as shown in FIG. 2, the internal microphone 138 is mounted to an instrument panel 140. The internal microphone 138 is a transducer that converts sound into an electrical signal. The internal microphone 138 can be any suitable type for receiving sound from an occupant 118 of the vehicle 100, e.g., a dynamic microphone, a condenser microphone, a piezoelectric microphone, an exciter-panel microphone, etc.

The system 102 can include internal speakers 142. The internal speakers 142 can be mounted inside the vehicle 100, e.g., in the passenger cabin 124. For example, as shown in FIG. 2, the internal speakers 142 are mounted to the instrument panel 140. The internal speakers 142 can be part of an audio infotainment system 144, described below. The internal speakers 142 can be any suitable type of speaker for outputting sound to the occupants 118 of the passenger cabin 124, e.g., dynamic loudspeakers.

The audio infotainment system 144 presents information to and receives information from the occupants 118 of the vehicle 100. The audio infotainment system 144 may be located, e.g., on the instrument panel 140 in the passenger cabin 124, or wherever the audio infotainment system 144 may be readily seen by the occupant 118. The audio infotainment system 144 may include dials, digital readouts, screens, speakers, and so on for providing information or entertainment to the occupant 118, e.g., human-machine interface (HMI) elements such as are known. The audio infotainment system 144 includes input sources such as a radio, CD player, auxiliary jack, and/or wired or wireless streaming via a mobile-device input. The audio infotainment system 144 may include buttons, knobs, keypads, a touchscreen, microphone, and so on for receiving information from the occupant 118.

Figure 3:
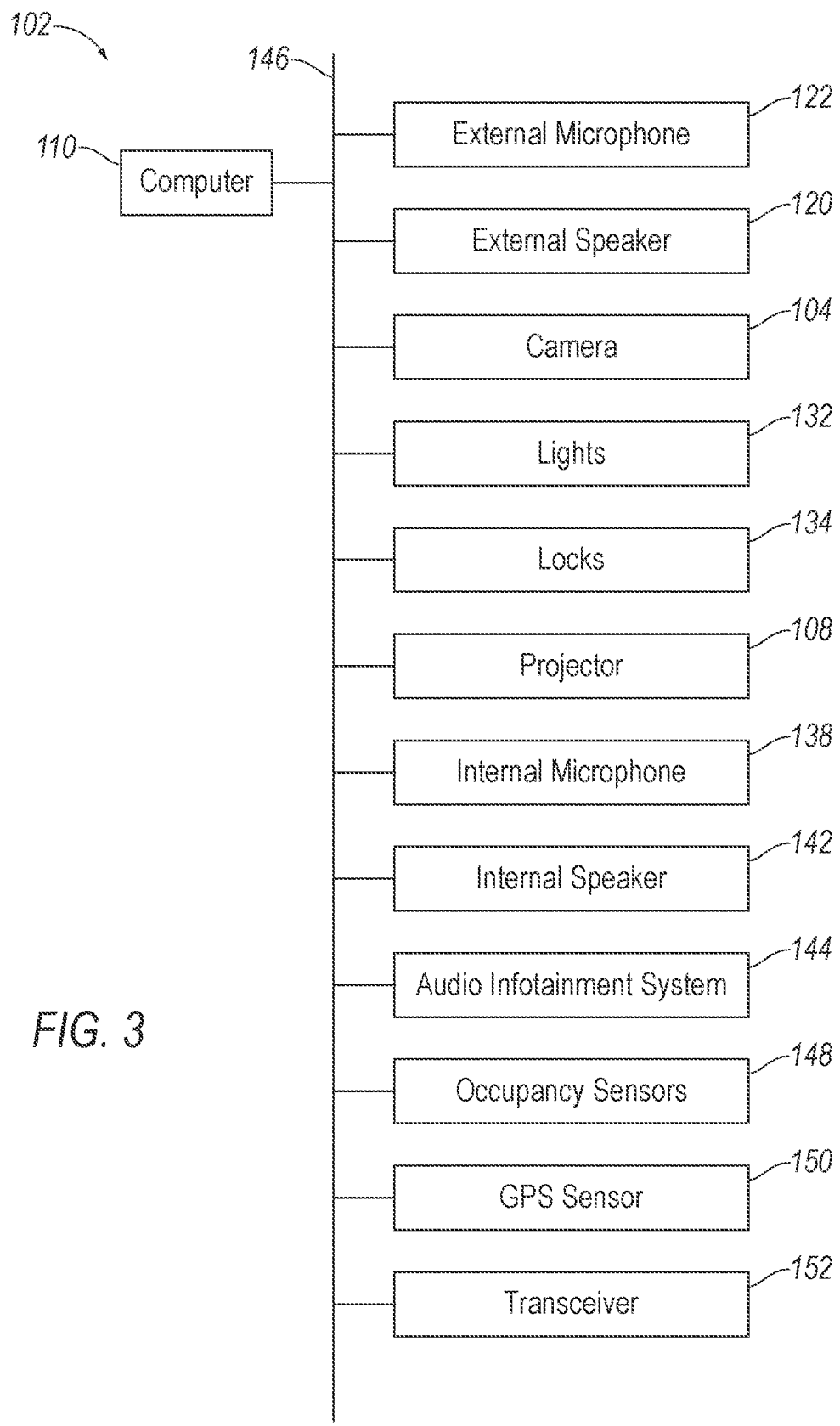
FIG. 3 is a block diagram of a system of the vehicle.

With reference to FIG. 3, the computer 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems 102 such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 110 can thus include a processor, a memory, etc. The memory of the computer 110 can include media for storing instructions executable by the processor as well as for electronically storing data and/or databases, and/or the computer 110 can include structures such as the foregoing by which programming is provided. The computer 110 can be multiple computers coupled together.

The computer 110 may transmit and receive data through a communications network 146 such as a controller area network (CAN) bus, Ethernet, WiFi, Local Interconnect Network (LIN), onboard diagnostics connector (OBD-II), and/or by any other wired or wireless communications network. The computer 110 may be communicatively coupled to the external microphone 122, the external speaker 120, the camera 104, the light 132, the locks 134, the projector 108, the internal microphone 138, the internal speakers 142, the audio infotainment system 144, occupancy sensors 148, a GPS sensor 150, a transceiver 152, and other components via the communications network 146.

The occupancy sensors 148 are configured to detect occupancy of the seats 136. The occupancy sensors 148 may be visible-light or infrared cameras directed at the seats 136, weight sensors inside the seats 136, sensors detecting whether seatbelts for the seats 136 are buckled, or other suitable sensors.

The GPS sensor 150 receives data from GPS satellites. The Global Positioning System (GPS) is a global navigation satellite system. The satellites broadcast time and geolocation data. The GPS sensor 150 can determine a location of the vehicle 100, i.e., latitude and longitude, based on receiving the time and geolocation data from multiple satellites simultaneously.

The transceiver 152 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), and other RF (radio frequency) communications, or light-based communications, etc. The transceiver 152 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 152 may be one device or may include a separate transmitter and receiver.

Figure 4:
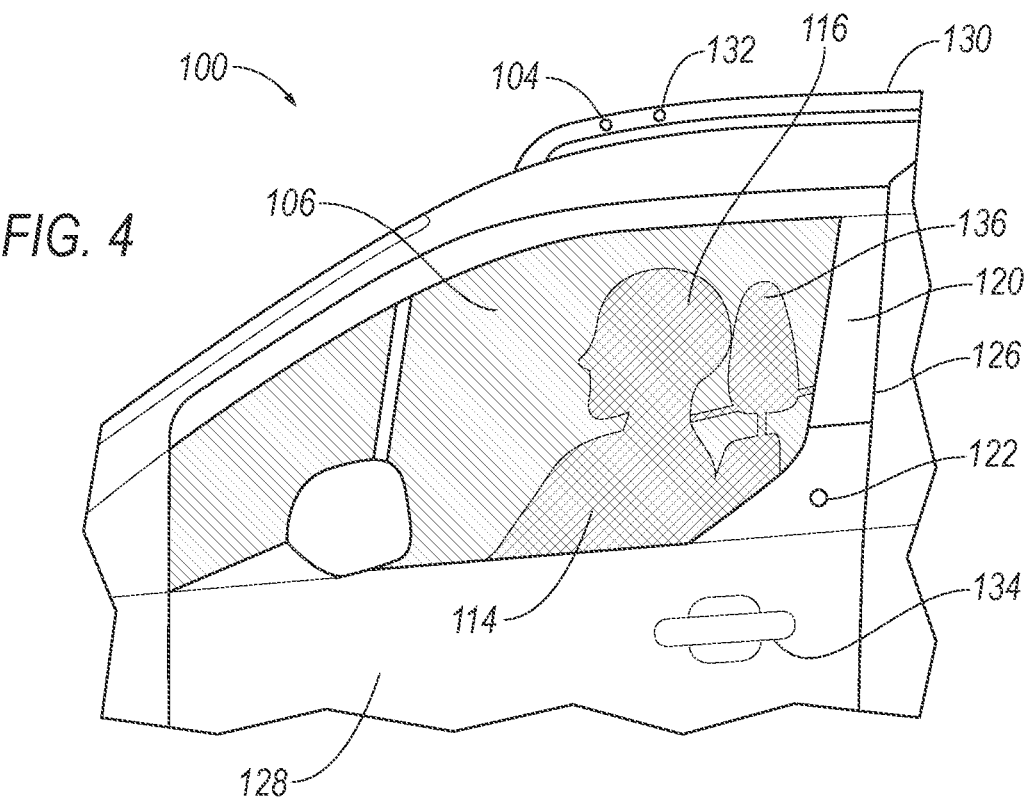
FIG. 4 is a plan view of a window of the vehicle with an example projection on the window.
Figure 5:
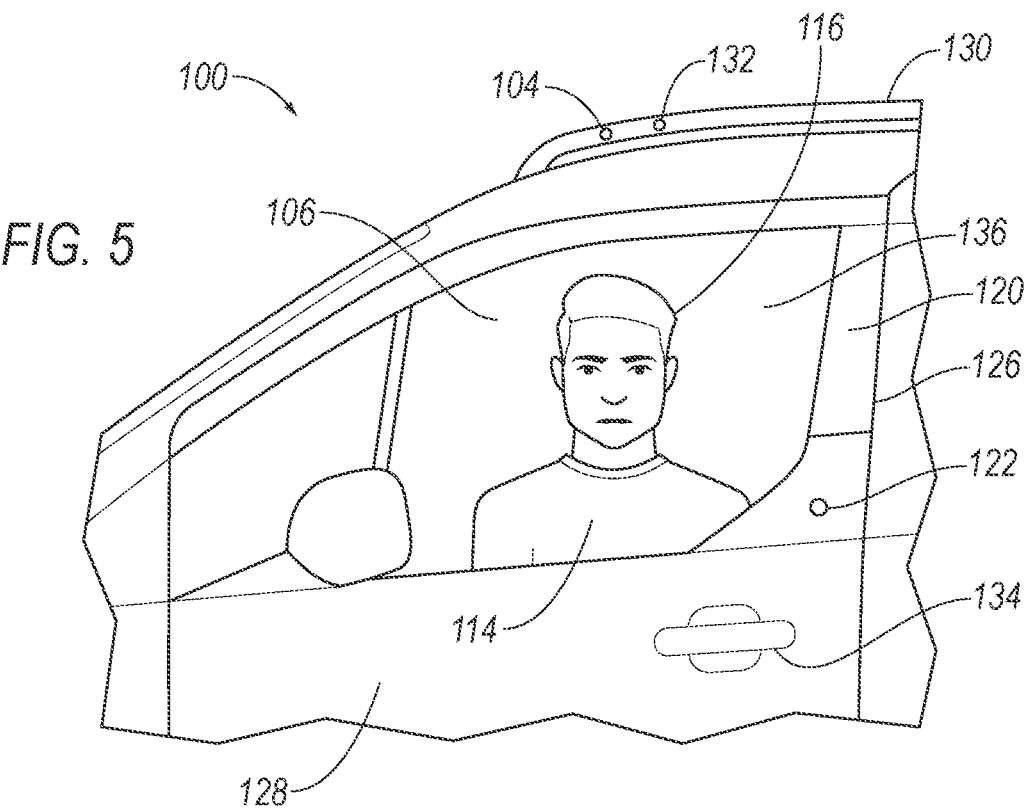
FIG. 5 is a plan view of the window with another example projection on the window.

With reference to FIGS. 4-5, the computer 110 can be programmed to, in response to criteria described below, instruct the projector 108 to project the image 114 on the window 106 depicting the second person 116 inside the vehicle 100. The image 114 can depict the second person 116 as a different person than the occupants 118 of the vehicle 100, e.g., as an adult man when the occupant 118 is a woman or an adolescent or, if the vehicle 100 is fully self-driving, a child. For example, the image 114 of the second person 116 can be stored in the memory of the computer 110, and the computer 110 can instruct the projector 108 to project the image 114 regardless of the identity of the occupants 118 of the vehicle 100. The image 114 of the second person 116 can deter the first person 112 from approaching the vehicle 100 in situations in which the occupants 118 do not want to interact with the first person 112.

With reference to FIG. 4, the image 114 can depict the second person 116 as a silhouette, i.e., as a darker region of the window 106 in the shape of the second person 116 with details of the second person 116 obscured. Using a silhouette for the second person 116 can be useful in combination with the window 106 being tinted. The occupants 118 can appear as silhouettes through tinted windows 106 under normal circumstances, e.g., without the image 114 projected onto the window 106. As a result, the first person 112, when standing outside the vehicle 100, may perceive the image 114 of the silhouette of the second person 116 as a real-time view of one of the occupants 118 of the vehicle 100. The image 114 of the silhouette of, e.g., an adult man may have a greater deterrent effect than a silhouette of the actual occupant or occupants 118.

With reference to FIG. 5, the image 114 can depict the second person 116 as an avatar, i.e., as an icon or figure representing the second person 116. The avatar can include details such as eyes, mouth, hair, etc. The avatar can be a photograph of the second person 116 or can be a representational graphic. The first person 112, when standing outside the vehicle 100, may understand that the avatar is not a real-time view of the occupants 118 but may still believe that the second person 116 depicted by the avatar is one of the occupants 118. The image 114 of the avatar of, e.g., an adult man may have a greater deterrent effect than seeing the actual occupant 118.

The computer 110 can be programmed to, in response to the criteria described below, apply a modification to a voice sound detected by the internal microphone 138, and instruct the external speaker 120 to play the modified voice sound. For example, the modification can include changing the tone or pitch of the voice sound, as is known. The modification can include deepening the voice sound, e.g., so that a voice sound produced by an occupant 118 who is a woman or an adolescent instead sounds like an adult man, which may add to the deterrent effect.

The computer 110 can be programmed to, in response to the criteria described below, instruct the external speaker 120 to play a stored audio recording. The stored audio recording can be stored in the memory of the computer 110. The stored audio recording can be chosen to deter the first person 112 from approaching the vehicle 100. For example, the stored audio recording can be a fake emergency call, e.g., a 911 call in the United States. For another example, the stored audio recording can be an announcement that an emergency call is being or will be placed.

The computer 110 can be programmed to, in response to the criteria described below, instruct the external speaker 120 to play the stored audio recording while playing the modified voice sound. For example, the stored audio recording can include questions from an operator during a fake emergency call with pauses to permit the occupant 118 to answer the questions. The voice sounds of the occupant 118 speaking, e.g., answering the questions of the stored audio recording, can be modified as described above.

The criteria for instructing the projector 108 to project the image 114 and instructing the external speaker 120 to play the modified voice sound and/or the stored audio recording can include one or more of receiving data from the camera 104 indicating the first person 112 outside the vehicle 100, determining that the first person 112 is not a recognized person, and determining that a risk score is greater than a risk threshold, as will each be described in turn. For example, the criteria can be all three, as described below with respect to an example process 600. For another example, the criteria can be receiving data from the camera 104 indicating the first person 112 outside the vehicle 100 and determining that the first person 112 is not a recognized person. For another example, the criterion can be just receiving data from the camera 104 indicating the first person 112 outside the vehicle 100.

The criteria can include receiving data from the camera 104 indicating the first person 112 outside the vehicle 100. The computer 110 can identify some object outside the vehicle 100 as a person using conventional image-recognition techniques, e.g., a convolutional neural network programmed to accept image data from the camera 104 as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a down-sampling operation along spatial dimensions; and fully connected layers, which generate based on the output of all neurons of the previous layer. The final layer of the convolutional neural network generates a score for each potential type of object, and the final output is the type with the highest score. If the type of object is "person," then the computer 110 determines that the first person 112 is outside the vehicle 100.

The criteria can include determining that the first person 112 is not a recognized person. For example, the computer 110 can perform facial recognition to determine whether a face of the first person 112 is a recognized face, i.e., a face stored in memory of a recognized person, i.e., a known individual such as an owner or operator of the vehicle 100. The computer 110 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc. For another example, the computer 110 can perform gait recognition to determine whether the stride of the first person 112 is a recognized gait, i.e., a gait stored in memory of a recognized person, i.e., a known individual such as an owner or operator of the vehicle 100.

The criteria can include determining that a risk score is greater than a risk threshold. A risk score is a measure of the risk of a current environment of the vehicle 100. A risk threshold is a measure of acceptance of risk, e.g., based on the occupants 118 of the vehicle 100. To determine whether the risk score is greater than the risk threshold, the computer 110 determines the risk score, determines the risk threshold, and compares the risk score to the risk threshold.

The computer 110 can be programmed to determine the risk score based on a location of the vehicle 100, a current time of day, and/or a number of mobile devices proximate to the vehicle 100. The computer 110 can receive the location of the vehicle 100 from the GPS sensor 150, and the computer 110 can request and receive data about the location from a remote server via the transceiver 152. The data about the location can include, e.g., crime rates, population density, etc. The computer 110 can determine the number of mobile devices proximate to the vehicle 100 based on the number of mobile devices detected by the transceiver 152. The computer 110 can determine the risk score using a lookup table stored in memory. The lookup table can include a risk score for each combination of the data about the location (e.g., population density), the current time of day, and/or the number of mobile devices proximate to the vehicle 100. The following is an example lookup table. The values of risk scores in the lookup table can be chosen according to statistical data about the effects of the inputs on crime rates.

| Number of Devices | Population Density | Time of Day | Risk Score |
|---|---|---|---|
| ≤5 | Low | Daytime | 1 |
|  |  | Evening | 3 |
|  |  | Night | 2 |
|  | Medium | Daytime | 3 |
|  |  | Evening | 4 |
|  |  | Night | 3 |
|  | High | Daytime | 3 |
|  |  | Evening | 5 |
|  |  | Night | 3 |
| ... | ... | ... | ... |
| >5 and ≤20 | Medium | Evening | 5 |
| ... | ... | ... | ... |
| ≥20 | High | Night | 5 |

The computer 110 can be programmed to determine the risk threshold based on the occupants 118 of the vehicle 100, e.g., based on a number of occupants 118 and/or demographics of the occupants 118, e.g., gender and/or age. The computer 110 can determine the number of occupants 118 based on data received from the occupancy sensors 148. The computer 110 can determine personal attributes about the occupants 118 based on profiles of the occupants 118 that store the attributes. For example, the profiles could be associated with a key or other device used to start the vehicle 100, stored in and retrieved from a remote computer, and/or entered into a user interface of the vehicle 100 by the occupants 118, e.g., when beginning the trip. The profiles can include fields for entering the gender and/or age of the occupant 118. The computer 110 can determine the risk threshold for each combination of number of occupants 118 and personal attributes, e.g., gender and/or age. Here is an example lookup table. The values of risk thresholds in the lookup table can be chosen according to perceived or estimated relative vulnerabilities.

| Number of Occupants | Oldest Age | Gender of Oldest | Risk Threshold |
|---|---|---|---|
| Any | Child | Any | 1 |
| 1 | Adolescent | Female | 2 |
|  |  | Male | 3 |
|  | Adult | Female | 2 |
|  |  | Male | 4 |
|  | Senior | Any | 2 |
| ... | ... | ... | ... |
| 2 | Adult | Female | 2 |
|  |  | Male | 5 |
| ... | ... | ... | ... |
| ≥4 | Adolescent | Female | 3 |
| ... | ... | ... | ... |

Figure 6:
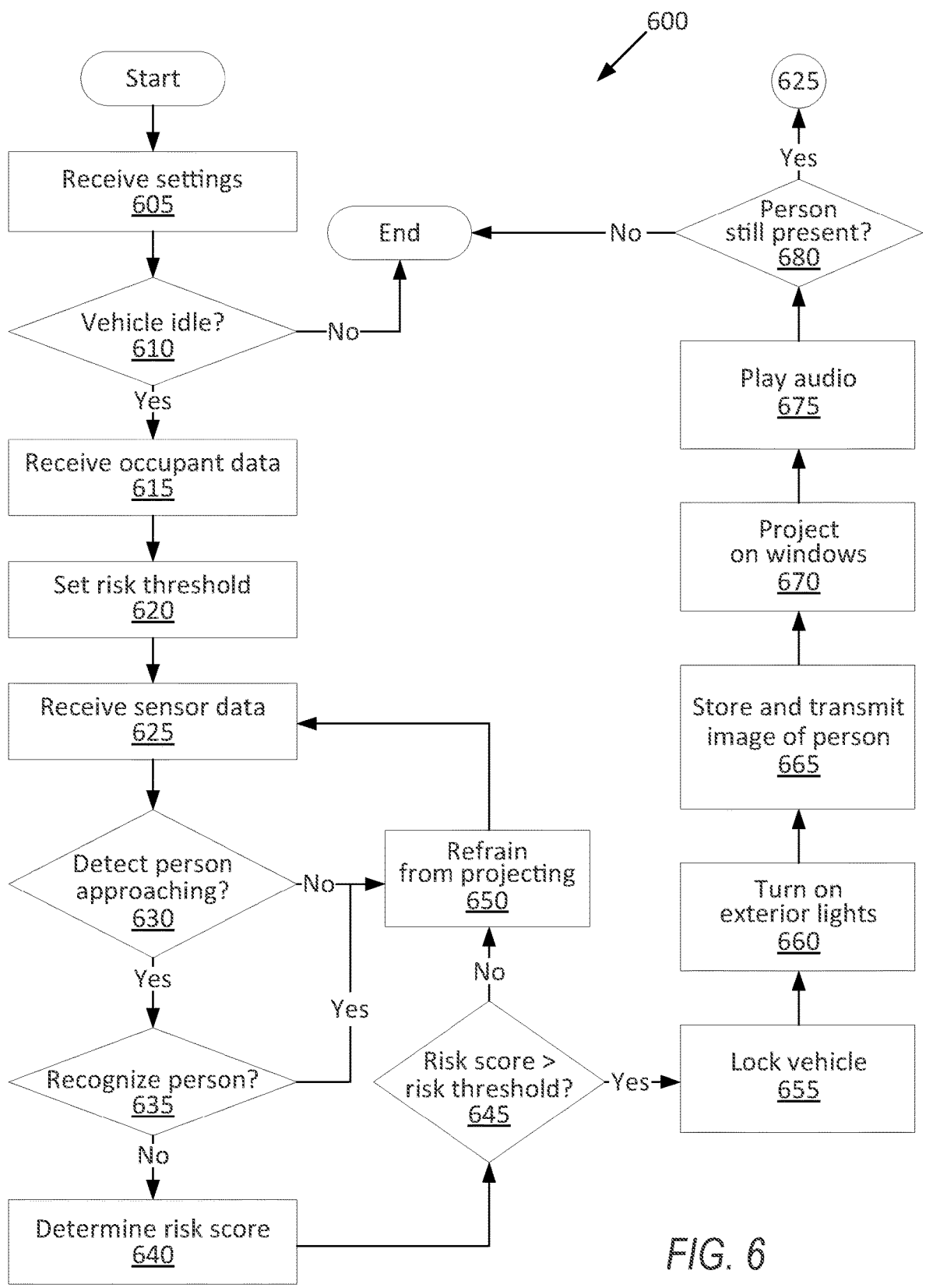
FIG. 6 is a process flow diagram of an example process for controlling the system of the vehicle.

FIG. 6 is a process flow diagram illustrating an exemplary process 600 for controlling the projector 108 and the external speakers 120. The memory of the computer 110 stores executable instructions for performing the steps of the process 600 and/or programming can be implemented in structures such as mentioned above. As a general overview of the process 600, the computer 110 receives settings related to the operation of the projector 108 and/or external speaker 120 and, if the vehicle 100 is idle, receives data about the occupants 118 and sets the risk threshold. If the criteria described above are not met, the computer 110 refrains from instructing the projector 108 to project the image 114 and from instructing the external speakers 120 to play. If the criteria are met, the computer 110 instructs the locks 134 to lock, instructs the light 132 to illuminate, stores and transmits image data of the first person 112 from the camera 104, instructs the projector 108 to project the image 114 on the window 106, and instructs the external speakers 120 to play the modified voice sounds and/or the stored audio recording. The process 600 continues for as long as the first person 112 is present outside the vehicle 100.

The process 600 begins in a block 605, in which the computer 110 receives inputs from the occupants 118 selecting settings for the projector 108 and/or the external speakers 120. For example, an input can set whether the image 114 depicts the second person 116 as a silhouette or an avatar. For another example, an input can set whether the computer 110 instructs the external speakers 120 to play the modified voice sounds, the stored audio recording, or both.

Next, in a decision block 610, the computer 110 determines whether the vehicle 100 is idle, i.e., is not moving and not off. If the vehicle 100 is moving, then the vehicle 100 is not idle. If the ignition of the vehicle 100 is set to off, then the vehicle 100 is not idle. If the vehicle 100 is not moving and the ignition of the vehicle 100 is set to on or accessory, then the vehicle 100 is idle. If the vehicle 100 is not idle, the process 600 ends. If the vehicle 100 is idle, the process 600 proceeds to a block 615.

In the block 615, the computer 110 receives data from the occupancy sensors 148 about the occupants 118 and receives profiles of the occupants 118, as described above.

Next, in a block 620, the computer 110 determines the risk threshold based on the data about the occupants 118, as described above.

Next, in a block 625, the computer 110 receives sensor data, e.g., image data from the camera 104, location data from the GPS sensor 150, audio data from the external microphone 122, etc.

Next, in a decision block 630, the computer 110 determines whether the image data from the camera 104 indicates the first person 112 outside the vehicle 100, as described above. If the image 114 data from the camera 104 indicates the first person 112 outside the vehicle 100, the process 600 proceeds to a decision block 635. If the image 114 data from the camera 104 does not indicate the first person 112 outside the vehicle 100, the process 600 proceeds to a block 650.

In the decision block 635, the computer 110 determines whether the first person 112 is a recognized person, as described above. If the first person 112 is not a recognized person, the process 600 proceeds to a block 640. If the first person 112 is a recognized person, the process 600 proceeds to the block 650.

In the block 640, the computer 110 determines the risk score, as described above. Because the block 640 is in a loop of monitoring the sensor data and evaluating the criteria, the computer 110 can update the risk score as the current time of day changes.

Next, in a decision block 645, the computer 110 determines whether the risk score is greater or less than the risk threshold. If the risk score is less than the risk threshold, the process 600 proceeds to the block 650. If the risk score is greater than the risk threshold, the process 600 proceeds to a block 655.

In the block 650, the computer 110 refrains from instructing the projector 108 to project the image 114, and the computer 110 refrains from instructing the external speaker 120 to play. After the block 650, the process 600 returns to the block 625 to continue monitoring the sensor data.

In the block 655, the computer 110 instructs the locks 134 to lock. Locking the locks 134 can prevent entry by the first person 112 into the vehicle 100.

Next, in a block 660, the computer 110 instructs the light 132 to illuminate. Illuminating the light 132 can provide a better view of the first person 112 for the camera 104 and possibly deter the first person 112 from approaching the vehicle 100.

Next, in a block 665, the computer 110 stores the image data of the first person 112 received from the camera 104 in memory. The computer 110 can instruct the transceiver 152 to transmit the image data of the first person 112 to a remote server.

Next, in a block 670, the computer 110 instructs the projector 108 to project the image 114 on the window 106 depicting the second person 116 inside the vehicle 100, as described above. The image 114 can be consistent with the settings set in the block 605.

Next, in a block 675, the computer 110 instructs the external speakers 120 to play the modified voice sounds, the stored audio recording, or both, as described above. What the external speakers 120 play can be consistent with the settings set in the block 605. The internal speakers 142 can play voice sounds detected by the external microphone 122, which the occupant 118 can choose to respond to if the external speaker 120 is playing the modified voice sounds of the occupants 118.

Next, in a decision block 680, the computer 110 determines whether the image data from the camera 104 still indicates the first person 112 outside the vehicle 100, as described with respect to the decision block 630 and further above. If the image 114 data from the camera 104 indicates the first person 112 outside the vehicle 100, the process 600 returns to the block 625 to continue monitoring the sensor data. If the image 114 data from the camera 104 does not indicate the first person 112 outside the vehicle 100, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
   a camera aimed externally to a vehicle;
   a window of the vehicle;
   a projector positioned to project on the window; and
   a computer communicatively coupled to the camera and the projector;
   the computer being programmed to, upon receiving data from the camera indicating a first person outside the vehicle, instruct the projector to project an image on the window depicting a second person inside the vehicle.

2. The system of claim 1, further comprising a speaker directed externally to the vehicle and communicatively coupled to the computer.

3. The system of claim 2, further comprising a microphone inside the vehicle and communicatively coupled to the computer, wherein the computer is programmed to, upon receiving the data from the camera indicating the first person outside the vehicle, apply a modification to a voice sound detected by the microphone, and instruct the speaker to play the modified voice sound.

4. The system of claim 3, wherein the modification includes deepening the voice sound.

5. The system of claim 3, wherein the computer is programmed to, upon receiving the data from the camera indicating the first person outside the vehicle, instruct the speaker to play a stored audio recording while playing the modified voice sound.

6. The system of claim 2, wherein the computer is programmed to, upon receiving the data from the camera indicating the first person outside the vehicle, instruct the speaker to play a stored audio recording.

7. The system of claim 1, wherein the window is tinted.

8. The system of claim 7, wherein the image depicts the second person as a silhouette.

9. The system of claim 1, wherein the computer is programmed to, upon receiving the data from the camera indicating the first person outside the vehicle, instruct locks of the vehicle to lock.

10. The system of claim 1, further comprising a light on an exterior of the vehicle and communicatively coupled to the computer, wherein the computer is programmed to, upon receiving the data from the camera indicating the first person outside the vehicle, instruct the light to illuminate.

11. The system of claim 1, wherein the computer is programmed to, upon receiving the data from the camera indicating the first person outside the vehicle, store image data of the first person of the data from the camera.

12. The system of claim 1, wherein the computer is programmed to, upon determining that the first person is a recognized person, refrain from instructing the projector to project.

13. The system of claim 1, wherein the image depicts the second person as a different person than occupants of the vehicle.

14. The system of claim 1, wherein the computer is programmed to, in response to a risk score being less than a risk threshold, refrain from instructing the projector to project.

15. The system of claim 14, wherein the computer is programmed to determine the risk score based on a location of the vehicle.

16. The system of claim 14, wherein the computer is programmed to determine the risk score based on a current time of day.

17. The system of claim 14, wherein the computer is programmed to determine the risk score based on a number of mobile devices proximate to the vehicle.

18. The system of claim 14, wherein the computer is programmed to determine the risk threshold based on occupants of the vehicle.

19. The system of claim 18, wherein the computer is programmed to determine the risk threshold based on a number of the occupants of the vehicle.

20. The system of claim 18, wherein the computer is programmed to determine the risk threshold based on personal attributes of the occupants of the vehicle.

* * * * *